(12) United States Patent
Dave (10) Patent No.: US 12,510,604 B2
(45) Date of Patent: Dec. 30, 2025

(54) SYSTEMS AND METHODS FOR DETERMINING INDICA FOR REMAINING USEFUL LIFE OF A BATTERY

(71) Applicant: Toyota Motor North America, Inc., Plano, TX (US)

(72) Inventor: Nilay Dave, McKinney, TX (US)

(73) Assignees: Toyota Motor North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 401 days.

(21) Appl. No.: 18/105,037

(22) Filed: Feb. 2, 2023

(65) Prior Publication Data
US 2024/0264241 A1 Aug. 8, 2024

(51) Int. Cl.
*G01R 31/396* (2019.01)
*G01R 31/36* (2020.01)
*G01R 31/367* (2019.01)
*G01R 31/392* (2019.01)

(52) U.S. Cl.
CPC ....... *G01R 31/396* (2019.01); *G01R 31/3648* (2013.01); *G01R 31/367* (2019.01); *G01R 31/392* (2019.01)

(58) Field of Classification Search
CPC .............. G01R 31/396; G01R 31/3648; G01R 31/367; G01R 31/392
See application file for complete search history.

(56) References Cited

U.S. PATENT DOCUMENTS

| | | | |
|---|---|---|---|
| 6,493,637 B1 * | 12/2002 | Steeg | G16B 30/10 702/19 |
| 8,362,749 B2 | 1/2013 | Komori et al. | |
| 9,166,261 B2 | 10/2015 | Ibi et al. | |
| 9,201,118 B2 | 12/2015 | Uchida et al. | |
| 9,285,433 B2 | 3/2016 | Kurimoto | |
| 9,397,374 B2 | 7/2016 | Yamauchi et al. | |

(Continued)

FOREIGN PATENT DOCUMENTS

KR  20210134147 A  11/2021

OTHER PUBLICATIONS

Takahashi, Aki et al., "Second-life Lithium-ion batteries: A chemistry-agnostic and scalable health estimation algorithm", 2022, pp. 1-22.
(Continued)

*Primary Examiner* — Tung S Lau
(74) *Attorney, Agent, or Firm* — Christopher G. Darrow; Darrow Mustafa PC (57) ABSTRACT

Systems, methods, and other embodiments described herein relate to determining salient attributes of batteries for characterizing battery value. In one embodiment, a method includes acquiring usage information about batteries that indicates aspects about prior use of the batteries. The method includes analyzing, using a predictor, the usage information to generate battery indicators about at least remaining useful life (RUL) for separate ones of the batteries. The method includes generating correlation values that specify an extent of correlation between the usage information and the RUL. The method includes providing a correlating subset of the usage information according to the correlation values to identify which parameters of the usage information specify the RUL for the batteries.

20 Claims, 4 Drawing Sheets

(56) References Cited

U.S. PATENT DOCUMENTS

| | | |
|---|---|---|
| 9,406,982 B2 | 8/2016 | Obata |
| 10,355,325 B2 | 7/2019 | Koba et al. |
| 11,072,258 B2 | 7/2021 | Kumar et al. |
| 11,186,201 B2 | 11/2021 | Trnka et al. |
| 11,351,886 B2 | 6/2022 | Zhao |
| 2015/0276881 A1 | 10/2015 | Liu et al. |
| 2020/0307413 A1 | 10/2020 | Nakanishi |
| 2021/0247447 A1* | 8/2021 | Desai .................. G06N 20/00 |
| 2021/0339653 A1 | 11/2021 | Yamamoto et al. |
| 2022/0149451 A1 | 5/2022 | Burchardt |
| 2022/0270189 A1* | 8/2022 | Wetherbee ............ G06F 17/18 |
| 2023/0123124 A1* | 4/2023 | Srinivasan .......... G01R 31/396 |
| | | 702/63 |

OTHER PUBLICATIONS

Sulzer, Valentin et al., "Promise and Challenges of a Data-Driven Approach for Battery Lifetime Prognostics", 2022, 7 pages.

Huotari, Matti et al. "Comparing seven methods for state-of-health time series prediction for the lithium-ion battery packs of forklifts", 2021, pp. 1-16.

Pozzato, Gabriele et al. "Modeling degradation of Lithium-ion batteries for second-life applications: preliminary results", IEEE Conference on Control Technology and Applications (CCTA), 2021, 6 pages.

Xu, Pengcheng et al. "Predicting Li-ion Battery Cycle Life with LSTM RNN", 2022, 8 pages.

* cited by examiner

SYSTEMS AND METHODS FOR DETERMINING INDICA FOR REMAINING USEFUL LIFE OF A BATTERY

TECHNICAL FIELD

The subject matter described herein relates, in general, to systems and methods for determining the remaining useful life (RUL) of a battery, and, more particularly, to determining which information about a battery provide salient correlations to the RUL.

BACKGROUND

As battery electric vehicles (BEVs) and other common uses of large-format rechargeable batteries proliferate, unique difficulties arise associated with secondary markets for such batteries. That is, while a used vehicle may be rather straightforward to value, valuing a used Lithium-ion or other large-format battery is more complex. Such batteries do not generally show their condition externally in the same way as a used vehicle may. Thus, simple inspection of a used battery from a BEV is generally not sufficient to determine characteristics that inform a value of the battery.

In some approaches, systems may consider many parameters about a battery to generate a determination about a remaining useful life (RUL) of the battery from which a determination of value or subsequent use can be derived. The RUL is an indicator of, for example, how long a battery may last according to a current state. The RUL can be defined according to various parameters, such as charge/discharge cycles, charging capacity, etc. The RUL may be calculated using a formula that considers many different variables, such as voltage, capacitance, resistance, number of charge cycles, operating temperatures of the battery, battery mass, current, period of use, running distance of the vehicle, frequency of recharging, operating temperature of the vehicle, climate of the external environment of the vehicle, mileage of the vehicle, operating characteristics of the vehicle, and so on. However, when variables are unavailable due to various reasons, the determination of RUL may become inaccurate. Furthermore, because these variables vary among different EV batteries, the RUL is generally calculated on a battery-to-battery basis. This may involve extracting battery management system (BMS) data for a single battery and running the calculation for that particular battery, which is tedious and subject to error. Accordingly, accurate and quick assessment of BEV batteries for remaining value can be unreliable.

SUMMARY

In one embodiment, example systems and methods relate to determining salient attributes of a BEV battery for characterizing battery value. As noted previously, determining the residual value of a used battery can present various difficulties. For example, missing usage information, such as mileage associated with a vehicle, charging history, or other information, can negatively impact the ability of a system to accurately determine the value of a battery. Furthermore, separately acquiring comprehensive battery usage information from a battery management system (BMS) may not be feasible in all circumstances. For example, if a BMS is damaged but the battery itself is still viable. As a result, accurately determining the RUL for a battery remains difficult.

Therefore, in at least one approach, an inventive system provides functionality to infer missing information and analyze data about populations of batteries in order to derive salient indicators that can be used in place of acquiring complex sets of information for each battery. For example, in at least one aspect, a disclosed system acquires usage information (e.g., BMS data, telematics data, etc.) about a plurality of batteries. The batteries may be of a same type or model in order to characterize the particular type/model. In any case, the usage information may not be complete (i.e., the usage information for at least a subset of the batteries may be missing some attributes) and the usage information does not include explicit indicators about the RUL for the separate batteries. Accordingly, the system includes a predictor that is, for example, a machine-learning model (e.g., a deep neural network) that is trained to infer the missing attributes and also the RUL for each separate battery.

As such, the system then, in at least one approach, aggregates the RUL for each battery along with the inferred indicators and original usage information. This aggregated information functions as a corpus over which correlating patterns may be identified. That is, the system applies one or more statistical analysis techniques to the aggregated information to identify which aspects of the information best correspond to the RUL. For example, the system may apply one or more forms of regression to the information to identify correlations that are present therein. In general, the system generates correlation coefficients and may then rank the indicators according to the coefficients. The indicators with coefficients satisfying a defined threshold (e.g., the top three correlating indicators) can then be provided as outputs to specify how to identify the RUL for similar batteries without performing an explicit analysis. In a further approach, the specific correlation relationship in the form of a diagram can be provided as an output to show specific values corresponding to the RUL at a given point. In this way, the disclosed system provides a mechanism for assessing used BEV batteries without requiring an independent complex analysis.

In one embodiment, a correlation system for determining salient attributes of batteries for characterizing battery value is disclosed. The correlation system includes one or more processors and a memory communicably coupled to the one or more processors. The memory stores a battery module including instructions that when executed by the one or more processors cause the one or more processors to acquire usage information about the batteries that indicates aspects about prior use of the batteries. The battery module includes instructions to analyze, using a predictor, the usage information to generate battery indicators about at least remaining useful life (RUL) for separate ones of the batteries. The battery module includes instructions to generate correlation values that specify an extent of correlation between the usage information and the RUL. The battery module includes instructions to provide a correlating subset of the usage information according to the correlation values to identify which parameters of the usage information specify the RUL for the batteries.

In one embodiment, a non-transitory computer-readable medium for determining salient attributes of batteries for characterizing battery and including instructions that, when executed by one or more processors, cause the one or more processors to perform various functions is disclosed. The instructions include instructions to acquire usage information about the batteries that indicates aspects about prior use of the batteries. The instructions include instructions to analyze, using a predictor, the usage information to generate battery indicators about at least remaining useful life (RUL) for separate ones of the batteries. The instructions include instructions to generate correlation values that specify an extent of correlation between the usage information and the RUL. The instructions include instructions to provide a correlating subset of the usage information according to the correlation values to identify which parameters of the usage information specify the RUL for the batteries.

In one embodiment, a method is disclosed. The method includes acquiring usage information about batteries that indicates aspects about prior use of the batteries. The method includes analyzing, using a predictor, the usage information to generate battery indicators about at least remaining useful life (RUL) for separate ones of the batteries. The method includes generating correlation values that specify an extent of correlation between the usage information and the RUL. The method includes providing a correlating subset of the usage information according to the correlation values to identify which parameters of the usage information specify the RUL for the batteries.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving determinations about residual battery value are described. In particular, one or more aspects described here are associated with determining salient attributes of a BEV battery for characterizing battery value. As noted previously, determining the residual value of a used battery can present various difficulties. For example, missing usage information, such as mileage associated with a vehicle, charging history, or other information, can negatively impact the ability of a system to accurately determine the value of a battery. Furthermore, separately acquiring comprehensive battery usage information from a battery management system (BMS) may not be feasible in all circumstances. For example, if a BMS is damaged but the battery itself is still viable. As a result, accurately determining the RUL for a battery remains difficult.

Therefore, in at least one approach, an inventive system provides functionality to infer missing information and analyze data about populations of batteries in order to derive salient indicators that can be used in place of acquiring complex sets of information for each battery. For example, in at least one aspect, a disclosed system acquires usage information (e.g., BMS data, telematics data, etc.) about a plurality of batteries. The batteries may be of a same type or model in order to characterize the particular type/model. In any case, the usage information may not be complete (i.e., the usage information for at least a subset of the batteries may be missing some attributes) and the usage information does not include explicit indicators about the RUL for the separate batteries. Accordingly, the system includes a predictor that is, for example, a machine-learning model (e.g., a deep neural network) that is trained to infer the missing attributes and also the RUL for each separate battery.

As such, the system then, in at least one approach, aggregates the RUL for each battery along with the inferred indicators and original usage information. This aggregated information functions as a corpus over which correlating patterns may be identified. That is, the system applies one or more statistical analysis techniques to the aggregated information to identify which aspects of the information best correspond to the RUL. For example, the system may apply one or more forms of regression to the information to identify correlations that are present therein. In general, the system generates correlation coefficients and may then rank the indicators according to the coefficients. The indicators with coefficients satisfying a defined threshold (e.g., the top three correlating indicators) can then be provided as outputs to specify how to identify the RUL for similar batteries without performing an explicit analysis. In a further approach, the specific correlation relationship in the form of a diagram can be provided as an output to show specific values corresponding to the RUL at a given point. In this way, the disclosed system provides a mechanism for assessing used BEV batteries without requiring an independent complex analysis.

Figure 1:
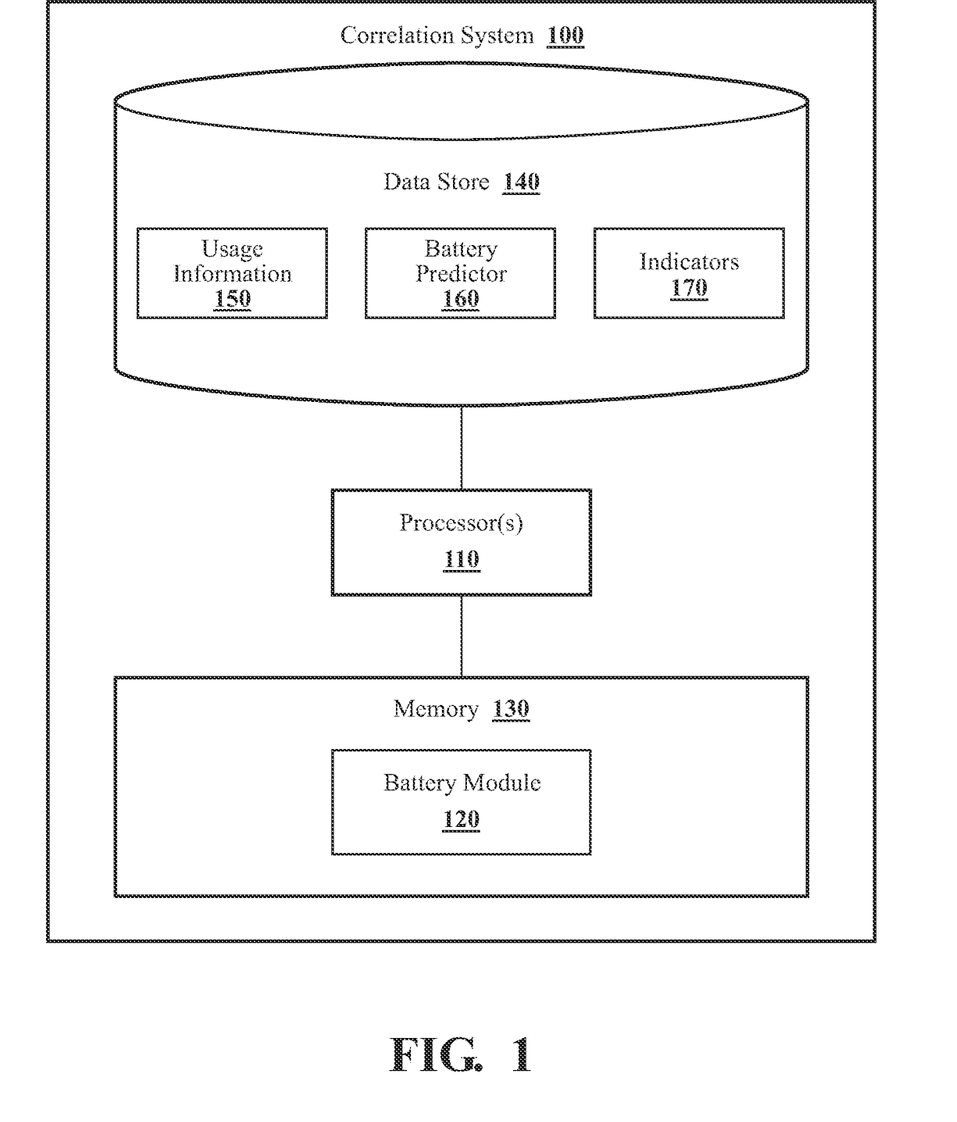
FIG. 1 illustrates one embodiment of a correlation system associated with analyzing battery usage information to identify attributes associated with a remaining useful life (RUL).

Referring to FIG. 1, one example of a correlation system 100 that functions to capture video of both workers and consumers and generate videos for display is shown. While depicted as a standalone component, in one or more embodiments, the correlation system 100 is cloud-based and thus can include elements that are distributed among different locations. In general, the correlation system 100 is implemented to acquire usage information 150 and analyze the usage information 150 using a battery predictor 160 to generate indicators 170. That is, in at least one approach, the correlation system 100 functions to acquire data about the usage of batteries that are generally of a same or similar type from which determinations about indicators of remaining useful life (RUL) and associated value can be extrapolated. The noted functions and methods will become more apparent with a further discussion of the figures.

With further reference to FIG. 1, one embodiment of the correlation system 100 is further illustrated. The correlation system 100 is shown as including a processor 110. Accordingly, the processor 110 may be a part of the correlation system 100, or the correlation system 100 may access the processor 110 through a data bus or another communication path. In one or more embodiments, the processor 110 is an application-specific integrated circuit (ASIC) that is configured to implement functions associated with a battery module 120. In general, the processor 110 is an electronic processor, such as a microprocessor that is capable of performing various functions as described herein. In one embodiment, the correlation system 100 includes a memory 130 that stores the battery module 120 and/or other modules that may function in support of generating depth information. The memory 130 is a random-access memory (RAM), read-only memory (ROM), a hard disk drive, a flash memory, or other suitable memory for storing the battery module 120. The battery module 120 is, for example, computer-readable instructions that, when executed by the processor 110, cause the processor 110 to perform the various functions disclosed herein. In further arrangements, the battery module 120 is a logic, integrated circuit, or another device for performing the noted functions that includes the instructions integrated therein.

Furthermore, in one embodiment, the correlation system 100 includes a data store 140. The data store 140 is, in one arrangement, an electronic data structure stored in the memory 130 or another electronic medium, and that is configured with routines that can be executed by the processor 110 for analyzing stored data, providing stored data, organizing stored data, and so on. Thus, in one embodiment, the data store 140 stores data used by the battery module 120 in executing various functions. For example, as depicted in FIG. 1, the data store 140 includes usage information 150, a battery predictor 160 that is, in at least one approach, a machine-learning model, and indicators 170, along with, for example, other information that is used and/or produced by the battery module 120. While the correlation system 100 is illustrated as including the various elements, it should be appreciated that one or more of the illustrated elements may not be included within the data store 140 in various implementations. For example, the correlation system 100, in one approach, may not include the battery predictor 160 but may instead the battery predictor 160 as a remote/cloud-based asset. In any case, the correlation system 100 stores various data elements in the data store 140 to support functions of the battery module 120.

Continuing with the highlighted data elements, the usage information 150 includes, for example, battery management system (BMS) information, telematics data, and other information acquired about the use of a battery. In general, the usage information 150 includes information that characterizes the use of a battery, which may include how an associated device (e.g., a vehicle) was used. Accordingly, as one example, the usage information 150 includes a voltage of the battery (e.g., total voltage output, per cell voltage, etc.), temperature (e.g., operating temperatures, temperature limits), coolant flow characteristics, electrical current, state of balance, state of health, state of charge over time (e.g., during periods of no use), charge/discharge cycles, charge/discharge rates, total operating time, resistance values, internal impedance, alerts (e.g., events of operating limits being exceeded), and so on. Further, while the noted parameters are generally described in relation to the battery as a discrete unit, the separate parameters may also be tracked in relation to individual cells. The foregoing is intended to be representative of one example and should not be construed as a limiting example.

It should be further appreciated that the indicated information may include historical data about the noted values over a history of the battery as opposed to discrete values from a present instant alone. In any case, the usage information 150 may further include telematics data of a vehicle in which the battery is installed. The telematics data can include vehicle mileage, operating locations (e.g., GPS coordinates), operating temperatures, driving characteristics (e.g., accelerations, decelerations, etc.), and so on. In general, the telematics data can encompass, for example, all aspects of the functioning of the vehicle and acquired information about surroundings of the vehicle. Overall, the usage information 150 includes information relating to the use of the battery and an associated device in order to provide a broad base of information that may impact a remaining useful life (RUL) of the battery. Moreover, while the usage information 150 is broadly described in relation to a single battery, it should be appreciated that the usage information 150 generally encompasses information aggregated from a plurality of batteries. In at least one approach, the plurality of batteries are of a same model (i.e., the same configuration and maker). In further aspects, the batteries may be of a same general type (i.e., the same chemistry), but are not the same make/model. In yet another aspect, the batteries may be of a wide population without consideration to the specific characteristics of the different batteries in the population. In any case, the batteries are generally understood to be large format batteries for use in devices, such as battery electric vehicles, battery backup devices for facilities, and so on.

Continuing with elements shown in the data store 140, the battery predictor 160 is, in one arrangement, a machine-learning model that can be implemented as a deep neural network (DNN), such as a fully connected artificial neural network, a recurrent neural network, or another DNN that can accept the usage information 150 and provide one or more inferences as an electronic output. In a further aspect, the battery predictor 160 may be a network of two or more DNNs that, for example, function in combination to generate multiple inferences about the usage information 150 where one or more of the inferences may be an input to a subsequent DNN.

In any case, FIG. 1 further illustrates the data store 140 as, including the indicators 170. The indicators 170, in at least one configuration, include aspects generated by the battery predictor 160 or at least a selection of a particular aspect of the usage information 150. For example, the indicators can include a remaining useful life (RUL). In at least one approach, the RUL is remaining cycle life of a battery that may be defined according to how many cycles for which the battery may be charged to capacity without reaching a failure threshold. Of course, the RUL may be defined according to various conditions of the battery that influence whether the battery remains useful or not. Thus, while cycle life is described as generally defining the RUL, in further approaches, battery voltage, discharge rates, or other characteristics may define the RUL for a particular application.

In further aspects, the battery predictor 160 also generates missing aspects of the usage information 150 in order to provide a comprehensive overview of a given battery. That is, the usage information 150 for a specific battery may not always be complete in that certain aspects of the information from, for example, a BMS or telematics data may be missing. This may be due to corrupted data, differences in monitoring systems that track different aspects of the battery or limit retention of certain values to a particular period of time. In any case, the battery predictor 160 is trained to output missing portions of the information to provide a complete suite of the usage information 150 for each separate battery. In this way, subsequent analysis of the usage information 150 across a population of batteries can provide a comprehensive characterization.

As an additional aspect, the training of the battery predictor 160 may occur according to various methods but is generally focused on supervised learning. Therefore, to initially train the battery predictor 160, the correlation system 100 employs training data that includes the RUL and all of the usage information for each battery. As such, the RUL and portions of the usage information 150 that correspond to missing aspects function as supervising signals in a loss function for training the battery predictor 160. In one approach, the correlation system 100 trains the battery predictor 160 by first generating a training data set by, for example, selectively removing values from the complete usage information, executing the battery predictor 160 over the modified usage information to generate predictions of the missing information and a predicted RUL, and then using the removed information and the actual RUL to generate a loss value according to a loss function. The correlation system 100 can then backpropagate the loss value to adapt the battery predictor 160, thereby training the battery predictor 160 to infer the missing information and the RUL.

Figure 2:
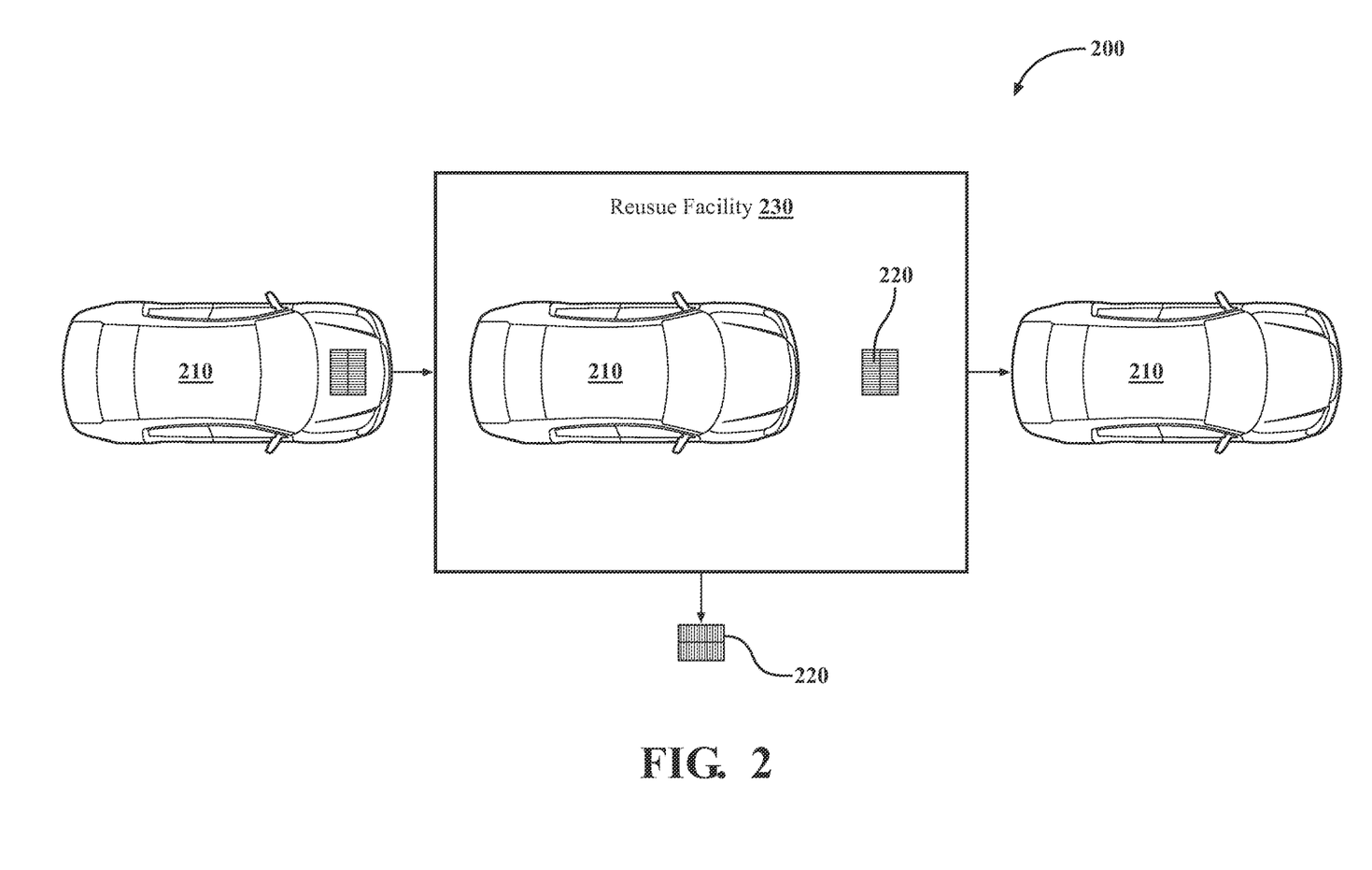
FIG. 2 illustrates one embodiment of a process for reusing a battery from a battery electric vehicle (BEV).

As one example of the context within which the correlation system 100 can be implemented, consider FIG. 2. FIG. 2 illustrates a diagram 200 representing a process for valuing and transitioning a used battery electric vehicle 210 having a battery 220 into a secondary market. In particular, a reuse facility 230, which may implement the correlation system 100 acquires the vehicle 210 and then assesses the vehicle 210 and the battery 220. Thus, the reuse facility 230 may inspect the battery 220 by, for example, using the correlation system 100 to acquire usage information from the battery 220 and telematics data from the vehicle 210. Based on a model/type of the battery, the correlation system 100 may include known indicators 170 from prior analysis of a population of the battery model/type to estimate the RUL without analysis of the usage information but instead by simply using the known indicators 170 as a lookup against the usage information. However, if the indicators 170 for the battery model/type are unknown, then the correlation system 100 may aggregate the information for a subsequent correlation analysis to derive the indicators 170.

Figure 3:
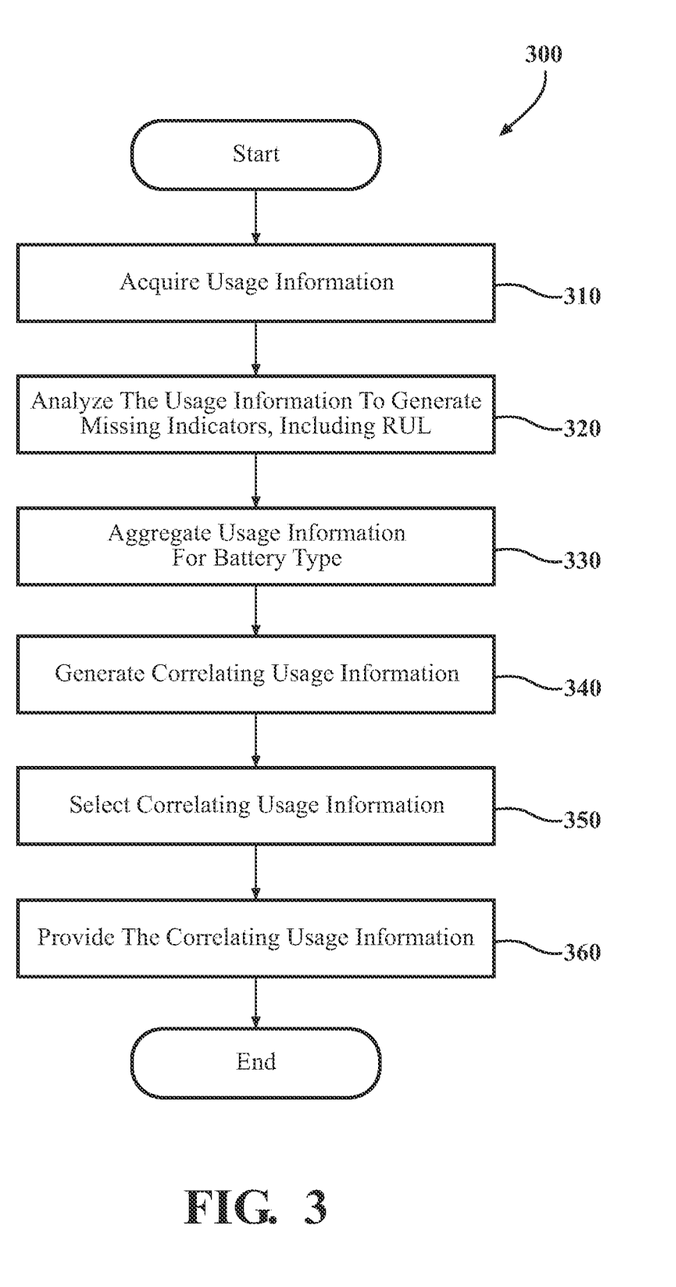
FIG. 3 is a flowchart illustrating one embodiment of a method for determining salient attributes of a battery in relation to a RUL.

Additional aspects of determining indicators of the RUL for a battery will be discussed in relation to FIG. 3. FIG. 3 illustrates a flowchart of a method 300 that is associated with determining salient attributes of batteries for characterizing battery value. Method 300 will be discussed from the perspective of the correlation system 100 of FIG. 1. While method 300 is discussed in combination with the correlation system 100, it should be appreciated that the method 300 is not limited to being implemented within the correlation system 100 but is instead one example of a system that may implement the method 300.

At 310, the battery module 120 acquires the usage information 150. As indicated previously, the usage information 150 indicates aspects about prior use of a given battery. Thus, in one arrangement, the battery module 120 acquires the usage information 150 by electronically retrieving the usage information 150 from a battery management system (BMS) associated with a battery, telematics data from a vehicle associated with the battery, or another source of information about how the battery was used (e.g., diagnostic data, etc.). In general, the battery module 120 functions to acquire the usage information 150 about a plurality of batteries in order to generate a corpus of information that can broadly characterize a value of the model/type of battery using available indicators instead of attempting to explicitly derive an RUL for each battery.

At 320, the battery module 120 analyzes, using the predictor 160, the usage information 150 to generate battery indicators 170. As noted previously, the battery indicators 170 include information about the batteries that is not present in the usage information 150. Thus, the battery indicators 170 include, in at least one configuration, remaining useful life (RUL) for each respective one of the batteries. In instances where additional information is missing from the usage information 150, the indicators 170 further include estimates of the missing information as generated by the battery predictor 160.

Accordingly, the battery module 120 controls the battery predictor 160 to infer the RUL from the usage information 150 as learned according to the supervised learning described previously. In general, the battery predictor 160 learns abstract correlations between the usage information 150 and the RUL in order to provide an inference about the RUL for a given battery and associated usage information 150. Similarly, when portions of the usage information 150 are missing for a battery, the battery predictor can infer the missing indicators for partially complete portions of the usage information 150. While the battery predictor 160 learns the correlations, the correlations are abstracted in the form of learned weights within the deep neural network. Thus, further analysis of the usage information 150 with the indicators 170 is needed in order to extrapolate the correlations into usable information.

At 330, the battery module 120 aggregates the usage information 150 and the inferred indicators 170 for batteries of a same defined model/type and thus share characteristics. In general, that battery module 120 distinguishes between battery model/type by considering physical characteristics and operating characteristics of the batteries. The physical characteristics include, for example, battery chemistry, size, and so on. The operating characteristics include operating voltages, charge density, and so on. Thus, the battery module 120 may simply characterize the batteries according known model numbers or otherwise characterize the batteries according to the noted characteristics into defined groups for subsequent analysis. In this way, the subsequent correlation analysis is executed over a population of batteries having at least similar attributes with expected similar responses and RUL values over time.

At 340, the battery module 120 generates correlation values that specify an extent of correlation between the usage information 150 and the RUL. That is, the usage information 150 for a given battery includes a plurality of different parameters, as previously noted. Accordingly, the battery module 120 functions to, in at least one approach, determine correlations between the parameters of the usage information 150 and the RUL as predicted by the predictor 160. In one arrangement, the battery module 120 generates the correlation values by calculating correlation coefficients for the parameters. The battery module 120 may determine the correlation coefficient by dividing the covariance by the product of the standard deviations for the two variables. In general, the standard deviation is a measure of the dispersion of data from its average. The correlation coefficient may be one approach to characterizing the correlation between values that shows, for example, linear correlations.

Moreover, the battery module 120 may further apply one or more additional statistical functions to characterize the correlations. For example, the battery module 120 may apply additional linear correlation functions, a nonlinear correlation function, and/or a monotonic correlation function in order to generate determinations about the correlations. Accordingly, the battery module 120 may apply various forms of regression analysis in order to determine the correlation between variables (i.e., between the RUL and the parameters). Thus, the battery module 120 may apply multiple different forms of analysis to determine whether there is a correlation between a given parameter and the RUL. While the correlation coefficient is highlighted and regression is generally noted as a form of analysis, the battery module 120 may implement parametric analysis, nonparametric analysis, Bayesian methods, interpolation, splines, and so on. Furthermore, in at least one aspect, the battery module 120 may also chart the relationships between the parameters and the RUL to provide corresponding visual aids.

At 350, the battery module 120 selects correlating usage information. For example, in one approach, the battery module 120 uses the correlation values generated at 340 to rank the parameters of the usage information 150. That is, correlation values are extrapolated into a ranking about which of the parameters of the usage information 150 best correspond to the RUL. From this ranking, the battery module 120 selects correlating usage information (e.g., a top n number of parameters that correspond to the RUL). In one approach, the battery module 120 defines a correlation threshold for selecting parameters. The correlation threshold may define an extent of correlation that is to exist for a parameter to be selected. In one example, the correlation threshold may be 95%. Thus, any of the parameters that meet the correlation threshold are selected as being indicative of the RUL. In this way, the battery module 120 can provide indicators about the RUL without acquiring and processing all of the usage information about a battery and instead provide clear correlations via defined relationships of the correlating usage information.

At 360, the battery module 120 provides a correlating subset of the usage information according to the correlation values to identify which of the usage information specify the RUL for the batteries. In one or more approaches, the battery module 120 provides the correlating information selected at 350 by modifying an electronic indicator to specify the RUL according to the correlating subset. That is, the battery module 120 adapts an indicator within the BMS of the battery, within an internal mechanism for assessing the battery, or within another electronic lookup to specify the correlating usage information and a relationship between the correlating usage information and the RUL. As such, the correlation system 100 can then avoid analyzing the usage information and instead apply the defined relationships associated with the correlating usage information to estimate the RUL. This approach provides for at least two improvements. The first is that only the correlating usage information needs to be retrieved from the BMS or telematics data, thereby conserving computing resources. The second is that the RUL can be determined more efficiently by simply using a basic lookup operation to reference the defined relationship of the correlating usage information without a need to perform intensive computations using the battery predictor 160. In this way, the correlation system 100 improves determinations about the RUL for a battery and the associated value of the battery according to the RUL.

Figure 4:
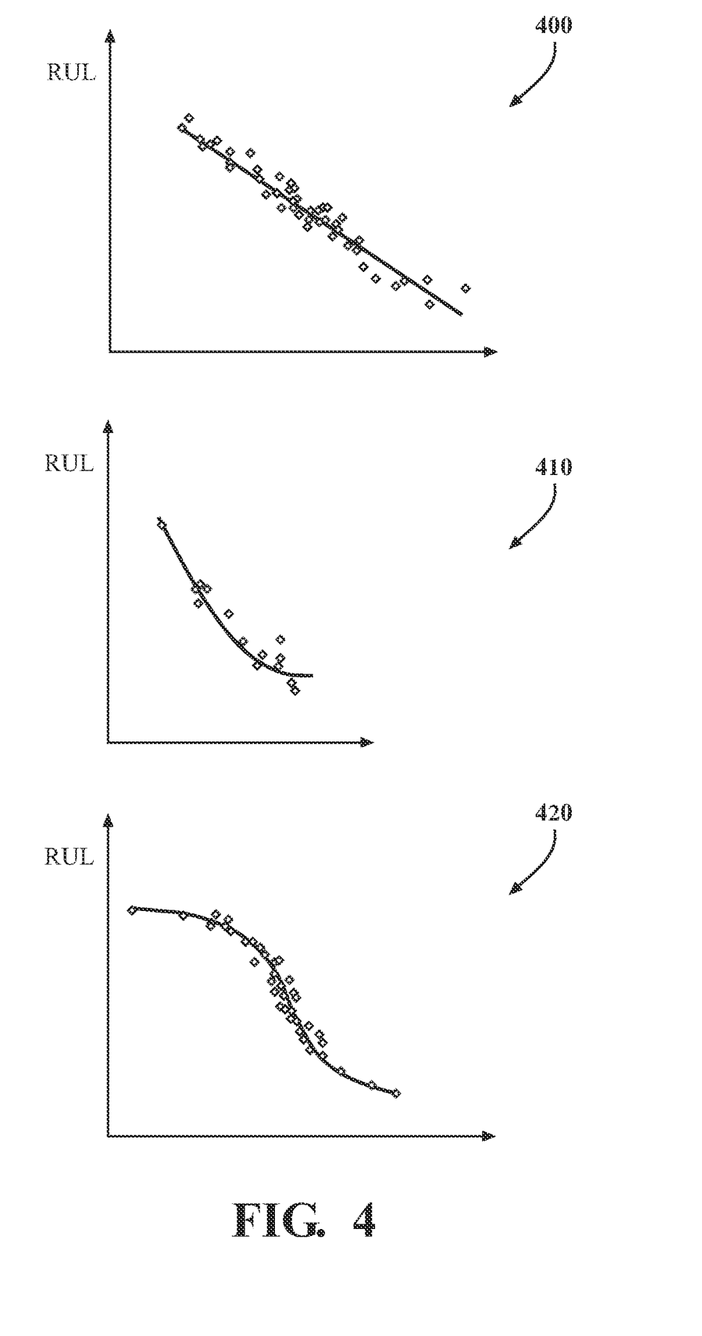
FIG. 4 illustrates example relationships between the RUL and indicators.

As a further example of how the correlation system 100 determines salient aspects of the usage information 150, consider FIG. 4. FIG. 4 illustrates relationships of particular correlating usage information with the RUL of a battery. As shown in FIG. 4, three separate examples 400, 410, and 420 are illustrated as charts of the RUL on the y-axis and the salient parameter on the x-axis. Example 400 illustrates a linear relationship between the RUL and, for example, an operational voltage of the battery. As shown, the relationships is identified as being linear as approximated via the illustrated line. Accordingly, the battery module 120 may reference the RUL for a particular battery of an associated model/type by simply acquiring the voltage information and referencing the relationship shown in the example 400.

Examples 410 and 420 further illustrate nonlinear and monotonic relationships but follow the same principles described in relation to example 400 in that the battery module 120 can simply acquire a value of the parameter and then use the identified relationship, as defined according to the analysis of the method 300, to lookup the RUL as opposed to predicting the RUL via machine learning and a large quantity of BMS and telematics data. In this way, the correlation system 100 provides an improved approach to determining the RUL of a battery that avoids computationally intensive approaches.

Detailed embodiments are disclosed herein. However, it is to be understood that the disclosed embodiments are intended only as examples. Therefore, specific structural and functional details disclosed herein are not to be interpreted as limiting but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. The term "operatively connected" and "communicatively coupled." as used throughout this description, can include direct or indirect connections, including connections without direct physical contact.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality." as used herein, is defined as two or more than two. The term "another," as used herein, is defined as at least a second or more. The terms "including" and/or "having." as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A correlation system for determining salient attributes of batteries for characterizing battery value, comprising:
 one or more processors;
 a memory communicably coupled to the one or more processors and storing:
  a battery module including instructions that, when executed by the one or more processors, cause the one or more processors to:
  acquire usage information about the batteries that indicates aspects about prior use of the batteries;
  analyze, using a predictor, the usage information to generate battery indicators about at least remaining useful life (RUL) for separate ones of the batteries;
  generate correlation values that specify an extent of correlation between the usage information and the RUL; and
  provide a correlating subset of the usage information according to the correlation values to identify which parameters of the usage information specify the RUL for the batteries without using a model, wherein the instructions to provide the correlating subset include instructions to adapt a battery management system (BMS) of a vehicle using the correlating subset to facilitate efficient determination of the RUL and adapt use of a battery by the BMS.

2. The correlation system of claim 1, wherein the batteries are of a same defined model that share physical characteristics and operating characteristics, and
 wherein the instructions to generate the correlation values include instructions to select one or more of the parameters from the usage information as the correlating subset according to a ranking of the parameters based, at least in part, on the correlation values.

3. The correlation system of claim 1, wherein the battery module includes instructions to analyze the usage information using the predictor including instructions to infer the RUL using the predictor with the usage information.

4. The correlation system of claim 3, wherein the battery module includes instructions to analyze the usage information including instructions to infer one or more missing indicators for partially complete portions of the usage information for a subset of the batteries using the predictor.

5. The correlation system of claim 3, wherein the predictor is a deep neural network (DNN) that is trained to infer the RUL and one or more missing indicators using supervised learning, and
 wherein the battery module includes instructions to acquire the usage information including instructions to electronically retrieve the usage information from at least the battery management system (BMS).

6. The correlation system of claim 1, wherein the battery module includes instructions to generate the correlation values including instructions to calculate correlation coefficients for the parameters of the usage information using statistical functions including at least one of a linear correlation function, a nonlinear correlation function, and a monotonic correlation function.

7. The correlation system of claim 1, wherein providing the correlating subset includes modifying an electronic indicator to specify the RUL according to the correlating subset.

8. The correlation system of claim 1, wherein the batteries are automotive batteries for electric vehicles.

9. A non-transitory computer-readable medium for determining salient attributes of batteries for characterizing battery value and including instructions that, when executed by one or more processors, cause the one or more processors to:
acquire usage information about the batteries that indicates aspects about prior use of the batteries;
analyze, using a predictor, the usage information to generate battery indicators about at least remaining useful life (RUL) for separate ones of the batteries;
generate correlation values that specify an extent of correlation between the usage information and the RUL; and
provide a correlating subset of the usage information according to the correlation values to identify which parameters of the usage information specify the RUL for the batteries without using a model, wherein the instructions to provide the correlating subset include instructions to adapt a battery management system (BMS) of a vehicle using the correlating subset to facilitate efficient determination of the RUL and adapt use of a battery by the BMS.

10. The non-transitory computer-readable medium of claim 9, wherein the batteries are of a same defined model that share physical characteristics and operating characteristics, and
wherein the instructions to generate the correlation values include instructions to select one or more of the parameters from the usage information as the correlating subset according to a ranking of the parameters based, at least in part, on the correlation values.

11. The non-transitory computer-readable medium of claim 9, wherein the instructions to analyze the usage information using the predictor include instructions to infer the RUL using the predictor with the usage information.

12. The non-transitory computer-readable medium of claim 11, wherein the instructions to analyze the usage information include instructions to infer one or more missing indicators for partially complete portions of the usage information for a subset of the batteries using the predictor.

13. The non-transitory computer-readable medium of claim 11, wherein the predictor is a deep neural network (DNN) that is trained to infer the RUL and one or more missing indicators using supervised learning, and
wherein the instructions to acquire the usage information include instructions to electronically retrieve the usage information from at least the battery management system (BMS).

14. A method, comprising:
acquiring usage information about batteries that indicates aspects about prior use of the batteries;
analyzing, using a predictor, the usage information to generate battery indicators about at least remaining useful life (RUL) for separate ones of the batteries;
generating correlation values that specify an extent of correlation between the usage information and the RUL; and
providing a correlating subset of the usage information according to the correlation values to identify which parameters of the usage information specify the RUL for the batteries without using a model, wherein providing the correlating subset includes adapting a battery management system (BMS) of a vehicle using the correlating subset to facilitate efficient determination of the RUL and adapt use of a battery by the BMS.

15. The method of claim 14, wherein the batteries are of a same defined model that share physical characteristics and operating characteristics, and
wherein generating the correlation values includes using the correlation values to select one or more of the parameters from the usage information as the correlating subset according to a ranking of the parameters based, at least in part, on the correlation values.

16. The method of claim 14, wherein analyzing the usage information using the predictor includes inferring the RUL using the predictor with the usage information, and
wherein the correlating subset of the usage information defines a subset of the parameters that indicate a direct correspondence with the RUL.

17. The method of claim 16, wherein analyzing the usage information includes inferring one or more missing indicators for partially complete portions of the usage information for a subset of the batteries using the predictor.

18. The method of claim 16, wherein the predictor is a deep neural network (DNN) that is trained to infer the RUL and one or more missing indicators using supervised learning, and
wherein acquiring the usage information includes electronically retrieving the usage information from at least the battery management system (BMS).

19. The method of claim 14, wherein generating the correlation values includes calculating correlation coefficients for the usage information using statistical functions including at least one of a linear correlation function, a nonlinear correlation function, and a monotonic correlation function.

20. The method of claim 14, wherein providing the correlating subset includes modifying an electronic indicator to specify the RUL according to the correlating subset; and
wherein the batteries are automotive batteries for electric vehicles.

* * * * *